United States Patent
Nakagome (10) Patent No.: US 6,601,903 B2
(45) Date of Patent: Aug. 5, 2003

(54) POWER UNIT FOR AUTOMOTIVE TRUNK LID

(75) Inventor: Katsumi Nakagome, Yokohama (JP)

(73) Assignee: OHI Seisakusho Co., Ltd., Kanagawa (JP)

(*) Notice: Subject to any disclaimer, the term of this patent is extended or adjusted under 35 U.S.C. 154(b) by 55 days.

(21) Appl. No.: 10/011,481

(22) Filed: Dec. 11, 2001

(65) Prior Publication Data

US 2002/0070579 A1 Jun. 13, 2002

(30) Foreign Application Priority Data

Dec. 11, 2000 (JP) .................................... 2000-376453

(51) Int. Cl.[7] ............................................ B62D 25/00
(52) U.S. Cl. .............................. 296/76; 49/339; 49/341
(58) Field of Search ....................... 296/76, 56, 146.8; 49/339, 340, 341

(56) References Cited

U.S. PATENT DOCUMENTS 6,425,205 B2 * 7/2002 Wygle et al. ................ 49/349
6,520,557 B2 * 2/2003 Benthaus et al. ............. 296/76
2003/0038500 A1 * 2/2003 Aubry et al. ................. 296/76

FOREIGN PATENT DOCUMENTS

JP 63-117979 7/1988

* cited by examiner

Primary Examiner—Joseph D. Pape
(74) Attorney, Agent, or Firm—Sughrue Mion, PLLC

(57) ABSTRACT

A base plate has mutually opposed first and second side surfaces. A first group of parts are arranged on the first side surface, which includes an electric motor, a speed reduction unit and an electromagnetic clutch. The speed reduction unit has a gear member which is projected to the second side surface from the first side surface through an opening formed in the base plate and driven by the motor when the electromagnetic clutch assumes ON condition. A second group of parts are arranged on the second side surface, which includes an intermediate gear which is rotatably connected to the base plate and meshed with the gear member, an output gear which is rotatably connected to the base plate through a shaft secured to the output gear and meshed with the intermediate gear and an output arm which is connected to the output gear to rotate therewith. The output arm is connected to the lid through a link.

15 Claims, 7 Drawing Sheets

FIG.1

FRONT ← → REAR

REAR ← → FRONT

LEFT ← → RIGHT

FIG.6

FRONT ← → REAR

FIG.7

POWER UNIT FOR AUTOMOTIVE TRUNK LID

BACKGROUND OF THE INVENTION

1. Field of the Invention

The present invention relates to power units for moving automotive movable members with the aid of electric power, and more particularly to power units of a type which moves an automotive trunk lid between open and closed positions with the aid of electric power.

2. Description of Related Art

Hitherto, various power units for automotive trunk lids have been proposed and put into practical use. One of them is shown in Laid-open Japanese Utility Model Application (Jikkai-sho) 63-117979. The power unit of this application is applied to a trunk lid which is pivotally connected to a vehicle body to open and close a trunk room defined in a rear part of the vehicle body. The power unit generally comprises an electric motor mounted on a panel in the trunk room, an output arm driven by the motor, a hinge arm fixed to the trunk lid and a link extending between the output arm and the hinge arm. That is, upon energization of the electric motor, the torque of the motor is transmitted to the hinge arm through the output arm and the link, thereby to open or close the trunk lid.

However, the power unit of the publication fails to have a compact construction, which thus causes a considerable reduction in an effective luggage receiving capacity of the trunk room. Furthermore, if a cover member is applied to the power unit for protecting internal parts of the power unit, the size of the power unit becomes much increased. Furthermore, in the power unit of the publication, it is difficult to properly mount the power unit on a right position of the vehicle body in a short time because it tends to occur that some of the movable parts of the power unit make a free movement when an assembler is handling the power unit to mount the same to the right position.

SUMMARY OF THE INVENTION

It is therefore an object of the present invention to provide a power unit for an automotive trunk lid, which is constructed compact in size.

It is another object of the present invention to provide a power unit for an automotive trunk lid, which is equipped with a temporarily holding arrangement by which a given part (viz., output arm) can be temporarily held at a given position when the power unit is not assembled on the vehicle body.

It is still another object of the present invention to provide a power unit for an automotive trunk lid, wherein essential parts of the power unit are mounted on both side surfaces of a base plate to achieve a balanced mounting of the parts.

It is a further object of the present invention to provide a power unit for an automotive trunk lid, which has a base plate which is formed with a flange by which essential parts of the power unit are protected or suppressed from interfering with surrounding external members.

According to a first aspect of the present invention, there is provided a power unit for moving a lid between open and closed positions with the aid of electric power, which comprises a base plate having mutually opposed first and second side surfaces; first group of parts arranged on the first side surface, the first group of parts including an electric motor which outputs rotation, a speed reduction unit which reduces a speed of the rotation outputted from the motor and an electromagnetic clutch, the speed reduction unit having a gear member which is projected to the second side surface from the first side surface through an opening formed in the base plate and driven by the motor when the electromagnetic clutch assumes ON condition; and second group of parts arranged on the second side surface, the second group of parts including an intermediate gear which is rotatably connected to the base plate and meshed with the gear member, an output gear which is rotatably connected to the base plate through a shaft secured to the output gear and meshed with the intermediate gear and an output arm which is connected to the output gear to rotate therewith, the output arm being linked to the lid.

According to a second aspect of the present invention, there is provided a power unit for pivoting an automotive trunk lid between open and closed positions with the aid of electric power, which comprises a base plate having mutually opposed first and second side surfaces; first group of parts arranged on the first side surface, the first group of parts including an electric motor which outputs rotation, a speed reduction unit which reduces a speed of the rotation outputted from the motor and an electromagnetic clutch, the speed reduction unit having a gear member which is projected to the second side surface from the first side surface through an opening formed in the base plate and driven by the motor when the electromagnetic clutch assumes ON condition; second group of parts arranged on the second side surface, the second group of parts including an intermediate gear which is rotatably connected to the base plate and meshed with the gear member, an output gear which is rotatably connected to the base plate through a shaft secured to the output gear and meshed with the intermediate gear and an output arm which has one end secured to the shaft thereby to rotate together with the output gear, the output arm having the other end which is adapted to be linked to the trunk lid, the second group of parts being arranged flatly on the second side surface in a manner to constitute a layered structure; and a temporarily holding arrangement for temporarily holding the output arm at a predetermined given angular position, the temporarily holding arrangement including an engaging opening formed in the output arm; and an engaging projection formed on the base plate, wherein when the output arm is turned to the given angular position, the engaging opening catches the engaging projection thereby to achieve a soft latched engagement therebetween.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENT

In the following, an embodiment of the present invention will be described with reference to the accompanying drawings.

Figure 1:
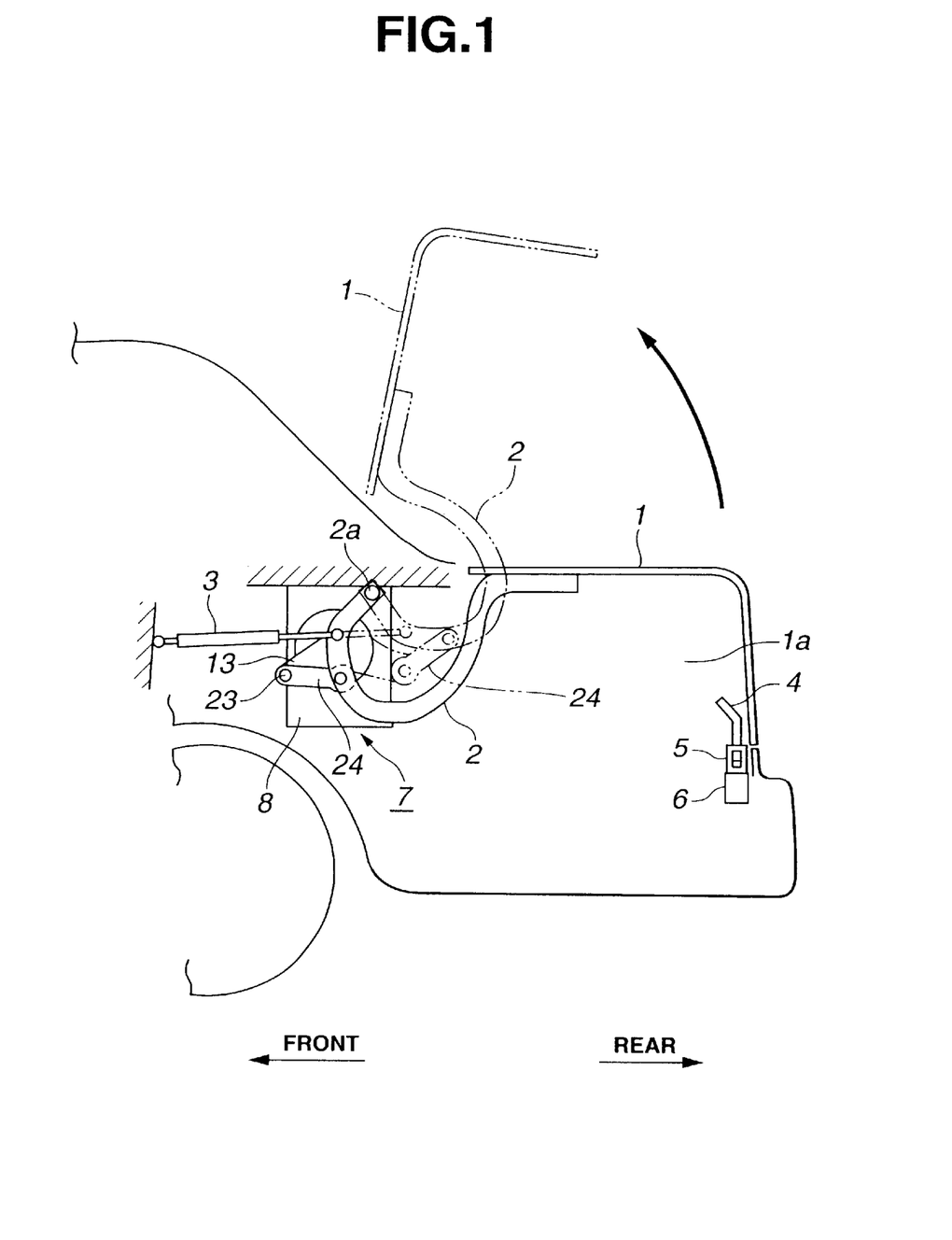
FIG. 1 is a schematic side view of a rear part of a motor vehicle, to which a power unit of the present invention is practically applied.

Referring to FIG. 1, there is shown a rear part of a motor vehicle to which a power unit 7 of the present invention is practically applied. As is shown in the drawing, the rear part of the vehicle has a pivotal trunk lid 1 to selectively close and open a trunk room 1a defined in the rear part. For the pivotal connection of the trunk lid 1 to the vehicle body, two curved hinge arms 2 are employed, which are positioned at laterally opposed portions of the trunk room 1a. The hinge arm 2 shown in the drawing is a left one that is positioned at a left side with respect to a travelling direction of the vehicle. Each hinge arm 2 has one end secured to the trunk lid 1 and the other end pivotally connected to the vehicle body through a hinge pin 2a. With this arrangement, the trunk lid 1 pivots between a full-closed position as shown by a solid line and a full-open position as shown by a phantom line.

Each hinge arm 2 is equipped with a gas-filled stay 3 which has one end fixed to the vehicle body. Due to provision of the gas-filled stays 3, the trunk lid 1 is biased in a direction toward the full-open position. That is, when the trunk lid 1 is pivoted down to the full-closed position, each gas-filled stay 3 is forced to take a shorter shape generating such biasing force. Thus, upward pivoting of the trunk lid 1 toward the full-open position is carried out with the aid of the biasing force of the gas-filled stays 3. Although not shown in the drawing, two stopper plates are secured to the vehicle body, against which the hinge arms 2 abut when the trunk lid 1 comes to the full-open position. Thus, due to provision of such stopper plates, further upward pivoting of the trunk lid 1 beyond the full-open position is suppressed.

The trunk lid 1 is equipped at its rear end with a lock device 4 which is engageable with a striker 5 secured to a rear wall of the trunk room 1a. That is, when the trunk lid 1 is pivoted down to the full-closed position, the lock device 4 latches the striker 5 thereby restraining the trunk lid 1 at the full-closed position. The lock device 4 is equipped with an electric actuator (not shown) which cancels the latched engagement between the lock device 4 and the striker 5 when energized.

The striker 5 is associated with a lid closure 6 which is also secured to the rear wall of the trunk room 1a. That is, when it is sensed that the striker 5 has been latched by the lock device 4 of the trunk lid 1, the lid closure 6 pulls down the striker 5 and thus the trunk lid 1 to a full-closed assured position.

In the following, the power unit 7 of the present invention will be described in detail with reference to the drawings, particularly FIGS. 1 to 4.

For ease of description, the following description contains various directional terms such as left, right, front, rear and the like. However, these terms are to be understood with respect to a traveling direction of the associated motor vehicle.

As will be seen from FIG. 1, the power unit 7 is incorporated with the left hinge arm 2 that is positioned left with respect to the vehicle travelling direction. As will become apparent as the description proceeds, the power unit 7 functions to open and close the trunk lid 1 with the aid of electric power.

As is seen from FIG. 1, the power unit 7 comprises a base plate 8 which is secured to a front left wall of the trunk room 1a by means of bolts or the like. That is, the base plate 8 is so oriented that a major flat part thereof extends in parallel with a longitudinal axis of the vehicle.

Figure 4:
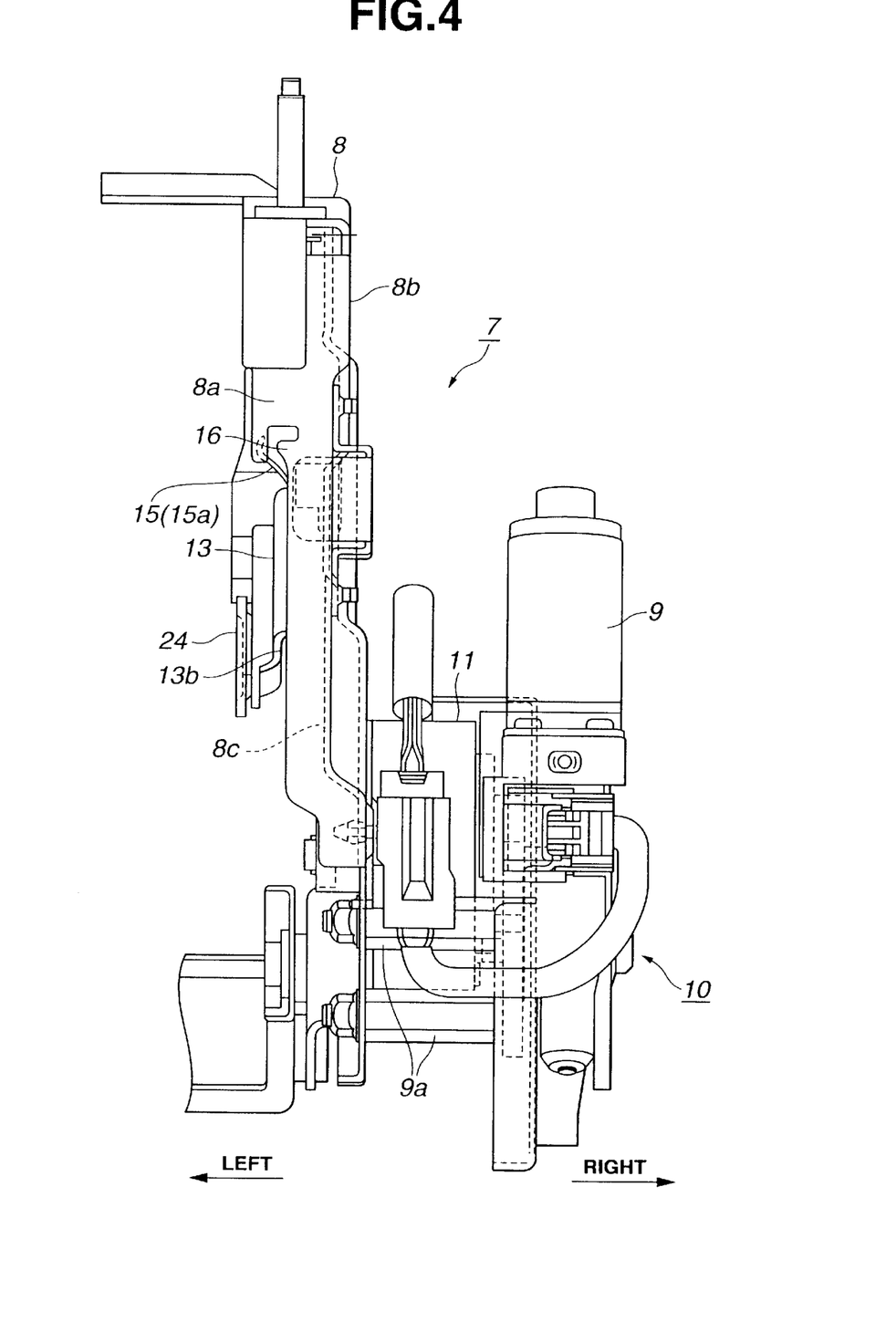
FIG. 4 is a view taken from a direction of the arrow "IV" of FIG. 2.

Thus, as is seen from FIG. 4, the base plate 8 is so arranged that the major flat part thereof has a right side surface 8b facing toward the interior of the trunk room 1a and a left side surface 8c facing toward outside of the vehicle. The base plate 8 has a low flange 8a which is bent toward the outside of the vehicle from upper and rear peripheral edges of the base plate 8.

As is seen from FIGS. 3 and 4, on the right side surface 8b of the base plate 8, there are arranged a reversible electric motor 9, a speed reduction unit 10, an electromagnetic clutch 11, a part of a first position sensor 14 and a part of a second position sensor 15 in such a manner as will be described hereinafter. The speed reduction unit 10 functions to reduce the speed of rotation outputted by the electric motor 9.

Figure 2:
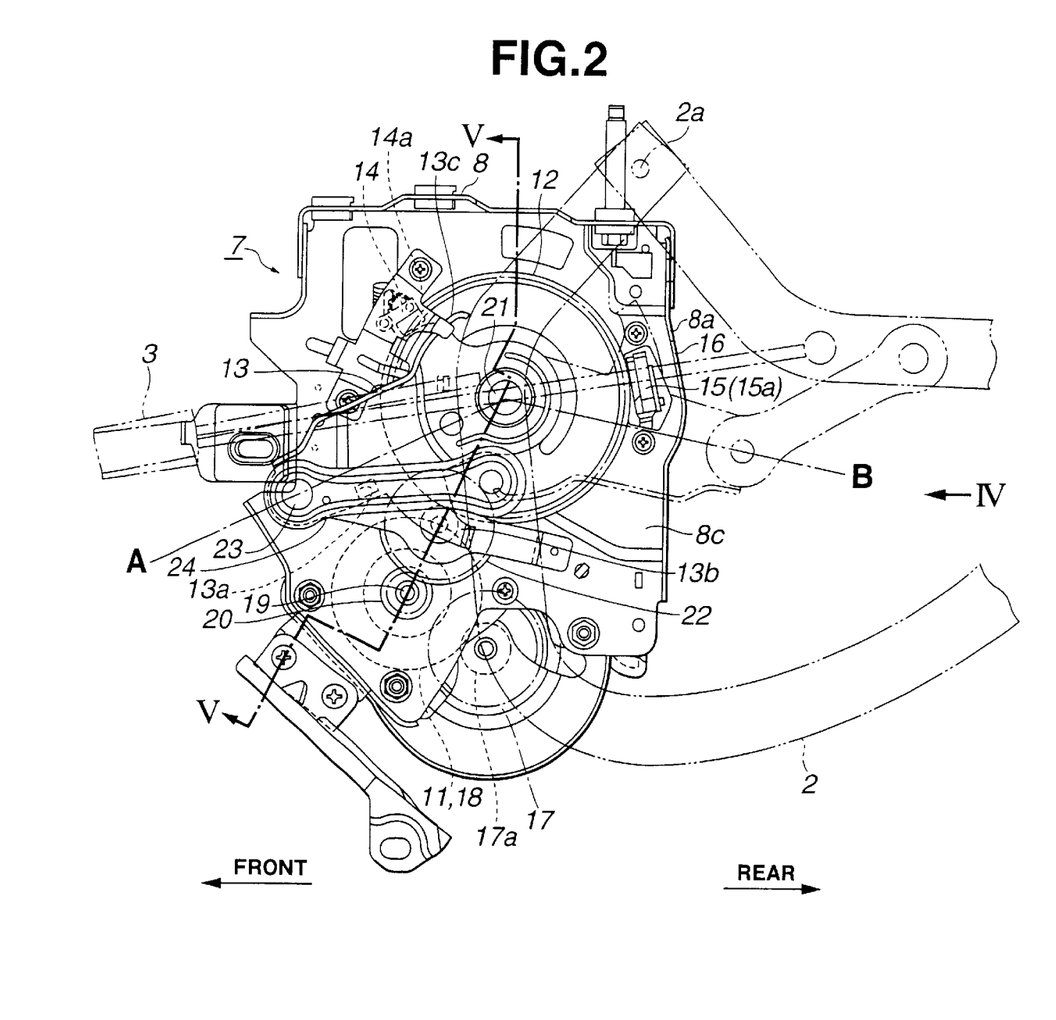
FIG. 2 is a plan view of the power unit of the present invention.
Figure 7:
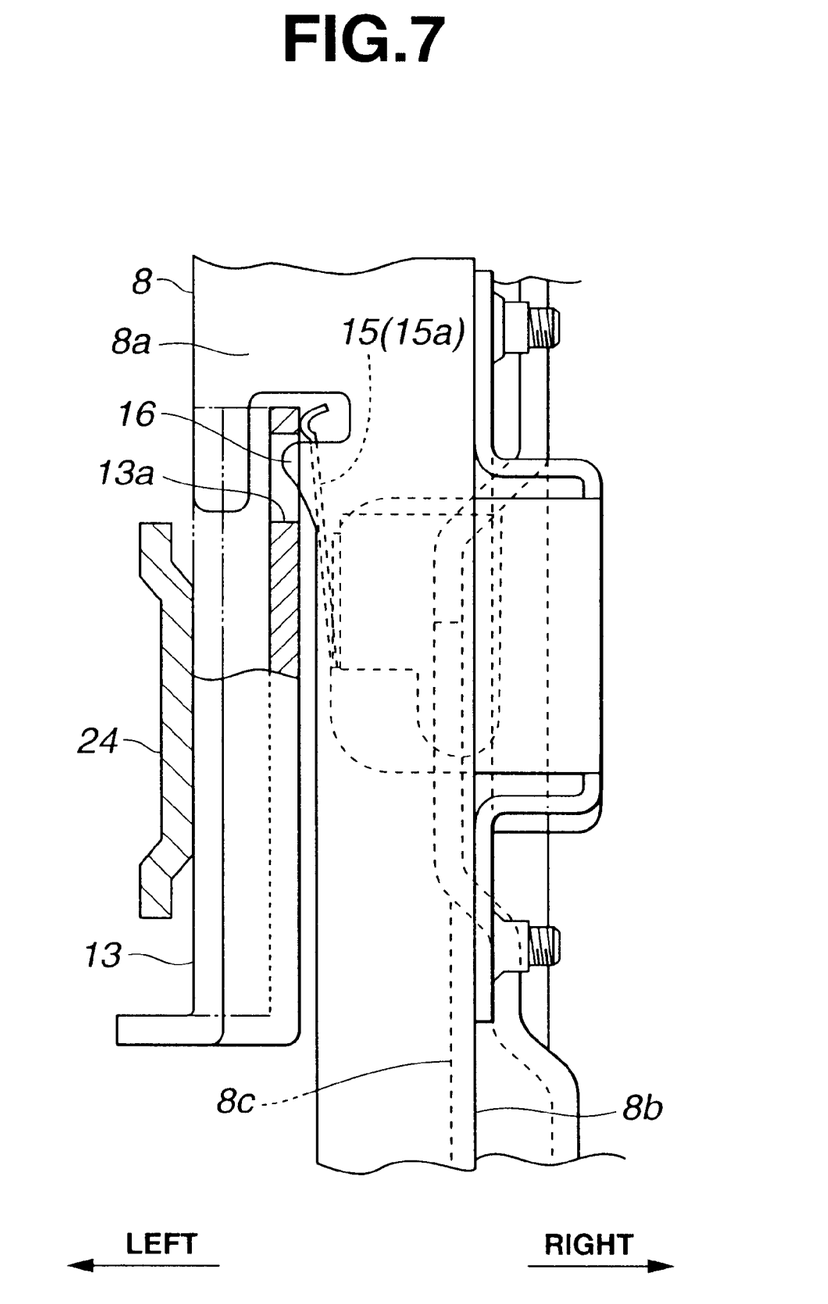
FIG. 7 is a sectional view taken along the line "VII—VII" of FIG. 6.

As is seen from FIGS. 2, 4 and 7, the flange 8a of the base plate 8 is provided at a rear part thereof with an engaging projection 16 which projects leftward (that is, toward the outside of the vehicle) for the purpose which will become apparent as the description proceeds.

As is seen from FIG. 4, by means of horizontally extending leg members 9a, the electric motor 9 is connected to the right side surface 8b of the base plate 8 in such a manner that an output shaft (not shown) of the motor 9 extends vertically. By operating a remote control switch (not shown) or a control switch (not shown) positioned near the trunk room 1a, the output shaft of the motor 9 is rotated in a desired direction.

As is seen from FIG. 4, the speed reduction unit 10 is arranged also on the right side surface 8b of the base plate 8. As is understood from FIGS. 3 and 5, the speed reduction unit 10 comprises a worm wheel 17 which is meshed with a worm (not shown) secured to the output shaft of the motor 9, a smaller gear 17a which is integrally and coaxially formed on the worm wheel 17, a first gear 18 which is meshed with the smaller gear 17a, a shaft 19 which rotatably carries the first gear 18 and a second gear 20 which is coaxially and securely connected to the shaft 19. As is seen from FIG. 5, the shaft 19 passes through an opening (no numeral) formed in the base plate 8 and the second gear 20 on the shaft 19 is exposed to the left side surface 8c of the base plate 8.

Figure 5:
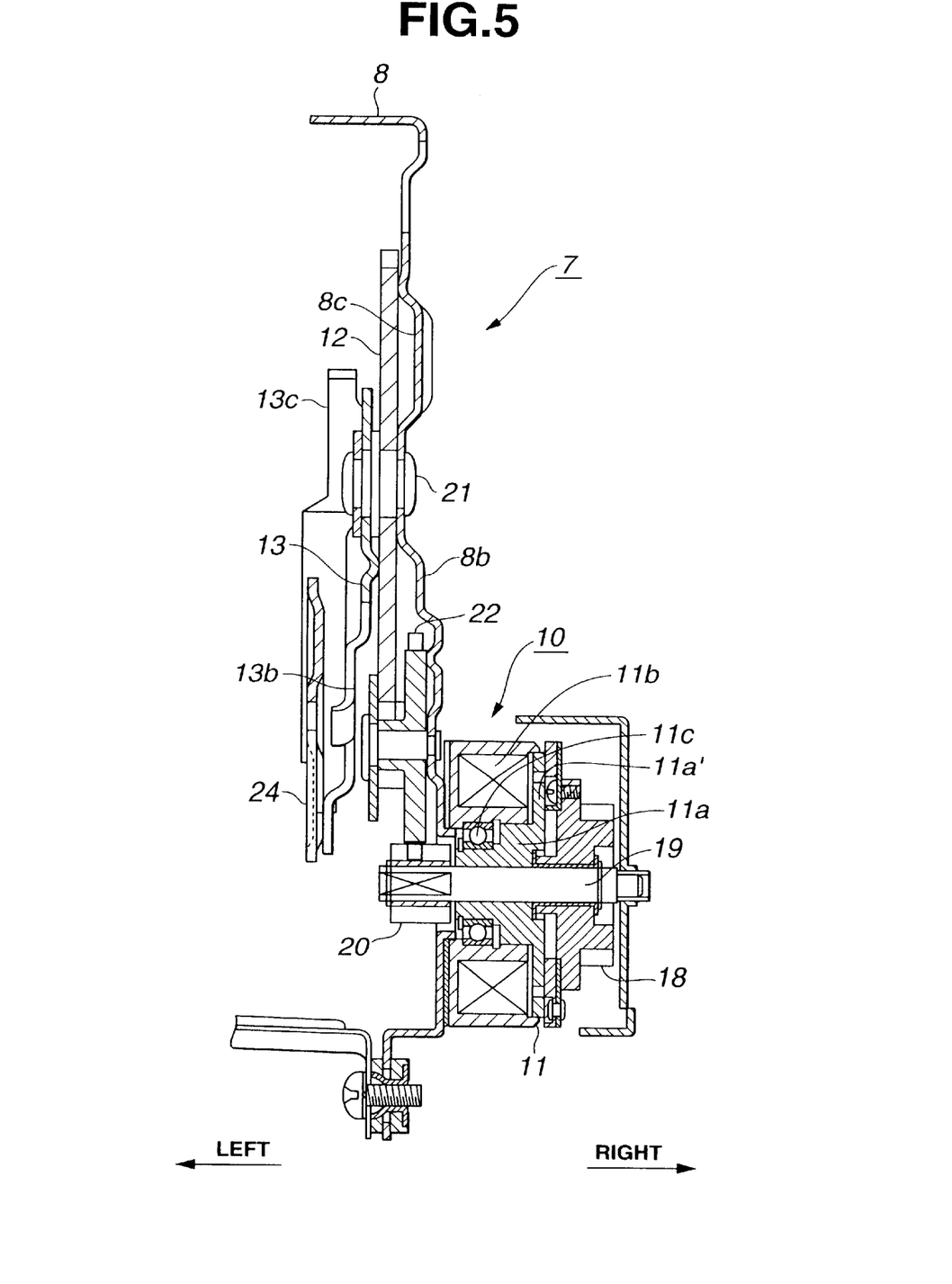
FIG. 5 is a sectional view taken along the line "V—V" of FIG. 2.

As is seen from FIG. 5, the electromagnetic clutch 11 is arranged between the first and second gears 18 and 20 to selectively couple and uncouple them. The clutch 11 comprises an annular core 11a which is tightly disposed on the shaft 19 to rotate together, an annular coil 11b which is fixed to the base plate 8 in a manner to surround the annular core 11a and a bearing unit 11c which is arranged between the annular core 11a and the annular coil 11b to smooth rotation of the annular core 11a. As shown, the annular core 11a has a disc plate portion 11a' which is put between the annular coil 11b and the first gear 18. Thus, when, due to operation of the remote control switch or the control switch, the annular coil 11b becomes energized, a magnetic force produced by the annular coil 11b strongly pulls a part of the first gear 18 toward the disc plate portion 11a' thereby to couple the first gear 18 and the annular core 11a. With this, the rotation force applied to the first gear 18 from the motor 9 is transmitted to the second gear 20.

As is seen from FIGS. 2 and 5, on the left side surface 8c of the base plate 8, there are arranged an output gear 12 and an intermediate gear 22. That is, the output gear 12 is rotatably connected to the left side surface 8c by means of a shaft 21 secured to the output gear 12, and the intermediate gear 22 is rotatably connected to the left side surface 8c by means of a shaft (no numeral). As is seen from FIG. 5, the output gear 12 is meshed with a smaller gear of the intermediate gear 22, and the intermediate gear 22 is meshed with the above-mentioned second gear 20. Accordingly, the rotation force (viz., torque) produced by the motor 9 is transmitted to the output gear 12 through the speed reduction unit 10, the first gear 18, the electromagnetic clutch 11 (ON condition), the second gear 20 and the intermediate gear 22.

Figure 6:
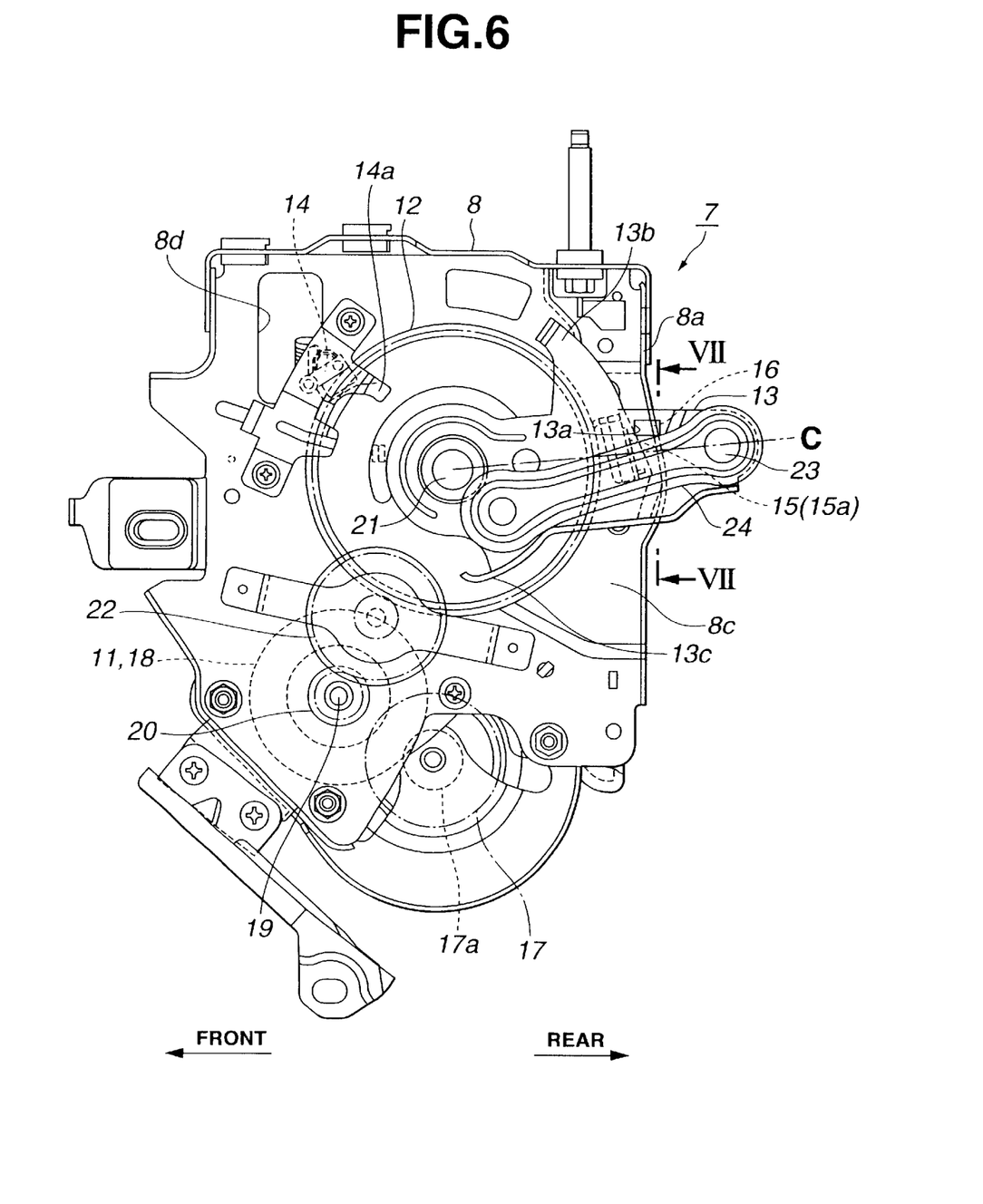
FIG. 6 is a view similar to FIG. 2, but showing a condition wherein an output arm is in a temporarily held position.

As is seen from FIGS. 2, 5 and 6, an output arm 13 is also located at the left side surface 8c of the base plate 8. The output arm 13 is connected to the output gear 12 through the shaft 21, so that the output arm 13 and the output gear 12 rotate like a single unit. As is seen from FIGS. 2 and 6, a free end of the output arm 13 has a shaft 23 to which one end of a link 24 is pivotally connected.

Referring back to FIG. 1, the other end of the link 24 is pivotally connected to a given portion of the left hinge arm 2.

As is seen from FIGS. 2 and 6, output arm 13 is formed near the free end thereof with an engaging opening 13a which is engageable with the above-mentioned engaging projection 16 formed on the flange 8a of the base plate 8. As is seen from these drawings, the engaging projection 16 is located in a travel path described by the engaging opening 13a when the output arm 13 is rotated together with the output gear 12.

As is seen from FIG. 6, the output arm 13 is formed at a middle portion thereof with a projection 13b which extends in a counterclockwise direction in the drawing. It is to be noted that the output arm 13 can slightly tilt relative to the shaft 21 for the reason which will become apparent hereinafter.

Thus, as is seen from FIG. 2, when, with the power unit 7 properly mounted on the vehicle body in the above-mentioned manner, the electric motor 9 is energized, the output arm 13 is pivoted like a pendulum between a full-closing position "A" as is shown by a solid line and a full-opening position "B" as is shown by a phantom line. The full-closing and full-opening positions "A" and "B" of the output arm 13 bring about the full-closed and full-open positions of the trunk lid 1. More specifically, as is seen from FIG. 1, when the link 24 connected to the output arm 13 takes a position illustrated by a solid line, the trunk lid 1 takes the full-closed position, and when the link 24 takes a position illustrated by a phantom line, the trunk lid 1 takes the full-open position. During this pivoting of the trunk lid 1, the output arm 13 swings like a pendulum.

As is seen from FIG. 6, the first position sensor 14 is set in an opening 8d formed in the base plate 8. The first position sensor 14 has a detector member 14a exposed to the left side surface 8c of the base plate 8, against which a flange 13c of the output arm 13 abuts when the output arm 13 assumes a given angular position. That is, the first position sensor 14 detects a condition wherein the output arm 13 comes to a position just before the full-closing position "A" (see FIG. 2).

Figure 3:
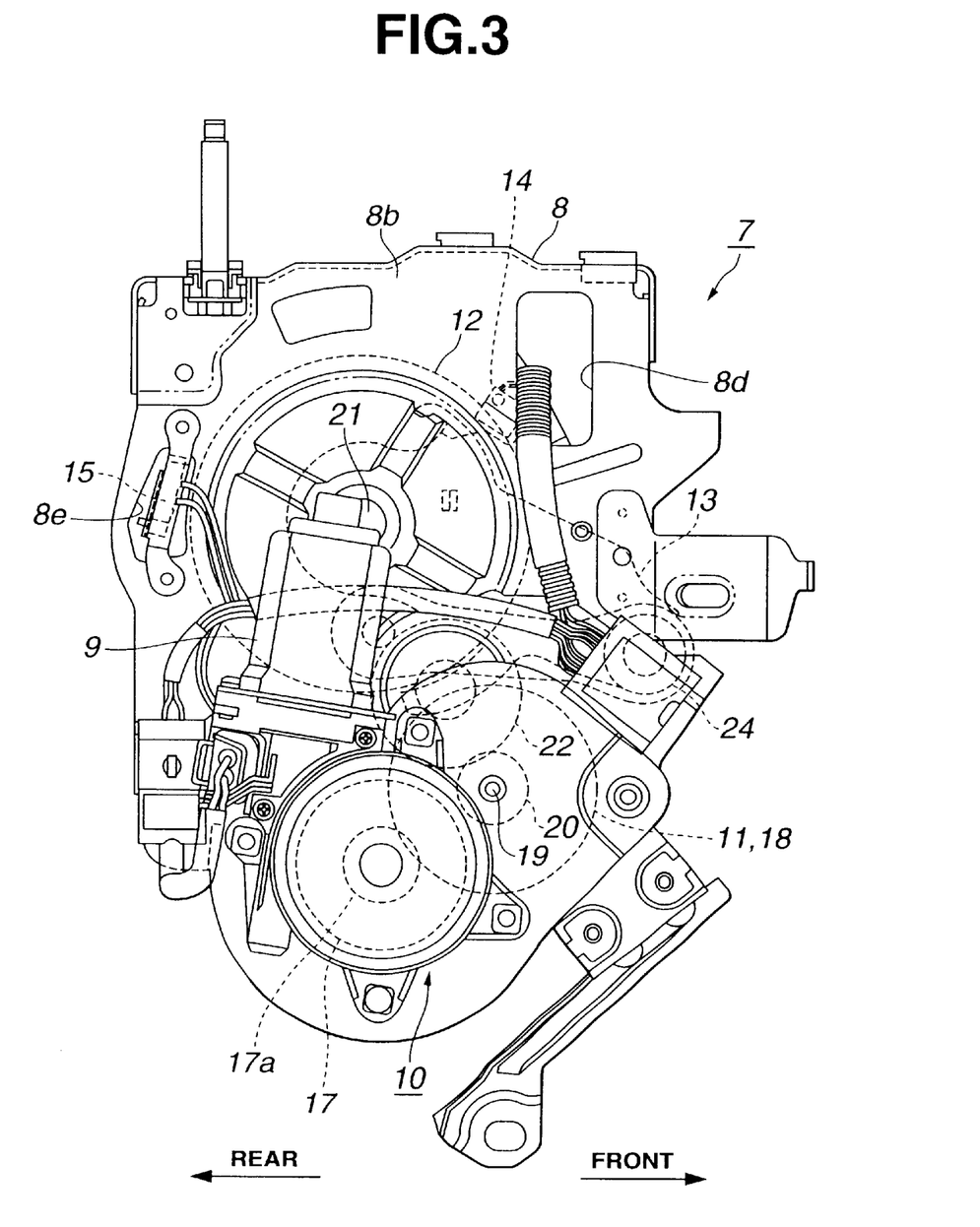
FIG. 3 is a back view of the power unit of the present invention.

As is seen from FIGS. 3 and 4, the second position sensor is set in an opening 8e formed in the base plate 8. The second position sensor 15 has a detector member 15a exposed to the left side surface 8c of the base plate 8, to which the projection 13b of the output arm 13 contacts when the output arm 13 assumes another given angular position. That is, the second position sensor 15 detects a condition wherein the output arm 13 comes to a position just before the full-opening position "B" (see FIG. 2).

Although not shown in the drawings, a known control unit is employed, which controls the electric actuator of the lock device 4, the electromagnetic clutch 11 and the electric motor 9 of the power unit 7 by processing information signals issued from the remote control switch (or control switch) and the first and second position sensors 14 and 15.

In the following, operation of the power unit 7 will be described with reference to the drawings.

For ease of understanding, the description will be commenced with respect to a condition wherein the trunk lid 1 assumes the full-closed assured position. Under this condition, due to function of the lid closure 6 (see FIG. 1), the trunk lid 1 takes the lowermost position pressing a weather strip (not shown) mounted on a peripheral edge of trunk room 1a. Of course, under this condition, the striker 5 is kept latched by the lock device 4. The output arm 13 assumes the full-closing position "A" of FIG. 2.

When now the remote control switch or control switch is operated for opening the trunk lid 1, the control unit forces the electric actuator to cancel the latched engagement between the striker 5 and the lock device 4 and forces the lid closure 6 to move up to its stand-by position. In response to completion of cancellation of the latched engagement between striker 5 and the lock device 4, the electromagnetic clutch 11 is energized to couple the first and second gears 18 and 20 (see FIG. 5) and the electric motor 9 is energized to run in a given direction. Upon this, the rotation force of the motor 9 is transmitted to the output arm 13 and thus, the output arm 13 is swung in a counterclockwise direction in FIG. 2 from the full-closing position "A" toward the full-opening position "B". In response to this counterclockwise swinging of the output arm 13, the left hinge arm 2 pushes the trunk lid 1, which has been released from the striker 5, toward the full-open position.

When, due to continuous operation of the electric motor 9, the raising trunk lid 1 comes up to a position just before the full-open position, the projection 13b of the output arm 13 contacts the detector member 15a of the second position sensor 15. Upon this, sensing the just-before position of the trunk lid 1, the control unit stops the power supply to the motor 9 and the electromagnetic clutch 11. Thus, thereafter, the upward movement of the trunk lid 1 to the full-open position is carried out by the biasing force of the gas-filled stays 3. When the trunk lid 1 reaches the full-open position, the output arm 13 takes the full-opening position "B" (see FIG. 2).

When now, with the trunk lid 1 assuming the full-open position, the remote control switch or control switch is operated for closing the trunk lid 1, the control unit energizes the electromagnetic clutch 11 and the electric motor 9 to run in a reversed direction. With this, the output arm 13 is rotated in a clockwise direction in FIG. 2 toward the full-closing position "A", inducing a closing pivoting of the trunk lid 1.

When, due to continuous operation of the electric motor 9, the lowering trunk lid 1 comes down to the full-close position where the lock device 4 latches the striker 5, the flange 13c of the output arm 13 abuts against the detector member 14a of the first position sensor 14. Upon this, sensing the full-close position of the trunk lid 1, the control unit stops the power supply to the motor 9 and the electromagnetic clutch 11, and then the control unit energizes the lid closure 6 to pull down the trunk lid 1 to the full-closed assured position. Then, the control unit stops the power supply to the lid closure 6.

As is seen from FIG. 6, when the link 24 is not connected with the hinge arm 2, that is, when the power unit 7 is not completely assembled on the vehicle body, the output arm 13 can assume an over-stroke position "C" that is beyond the full-opening position "B" by a certain degree. In other words, when the power unit 7 is completely assembled on the vehicle body having the link 24 connected with the hinge arm 2, the output arm 13 is not permitted to take such over-stroke position "C" due to the connection between the link 24 and the hinge arm 2. It is to be noted that the turning of the output arm 13 to the over-stroke position "C" is permitted because of provision of the electromagnetic clutch 11 which assumes OFF (or disengaged) condition when deenergized.

When, with the power unit 7 being in the incompletely assembled condition, the output arm 13 is turned to the over-stroke position "C", the engaging opening 13a of the output arm 13 is brought into engagement with the engaging projection 16 of the base plate 8. Thus, under this condition, the over-stroke position "C" of the output arm 13 relative to the base plate 8 can be temporarily held. Under this condition, the detector member 15a of the second position sensor 15 is placed or concealed between the output arm 13 and the base plate 8 preventing the sensitive detector member 15a from being exposed to the outside. That is, under this condition, the output arm 13 covers or protects the detector member 15a.

The above-mentioned temporarily held positioning of the output arm 13 can exhibit advantages particularly under conveyance and/or assembling work of the power unit 7. That is, under such condition, the output arm 13 covers and protects the sensitive detector member 15a of the second position sensor 15, which facilitates the assembling work of the power unit 7 onto the vehicle body.

Once the power unit 7 is mounted onto the front left wall of the trunk room 1a of the vehicle body, the free end portion of the output arm 13 is pulled away from the base plate 8 to release the engaging opening 13a from the engaging projection 16. Then, the output arm 13 is turned back manually to the full-opening position "B" and then, with the output arm 13 kept in this full-opening position "B", the link 24 is connected to the left hinge arm 2 with the trunk lid 1 assuming the full-open position. With these steps, mounting of the power unit 7 to the vehicle body is completed.

As is described hereinabove, once the power unit 7 is finally mounted on the vehicle body, the output arm 13 is suppressed from pivoting to the above-mentioned over-stroke position "C", and thus undesired engagement between the engaging opening 13a and the engaging projection 16 during rotation of the output arm 13 does not occur.

In the following, advantages of the present invention will be described.

First, as is seen from FIGS. 4 and 5, essential parts of the power unit 7, such as, the motor 9, speed reduction unit 10, the electromagnetic clutch 11, intermediate gear 22, output gear 12 and output arm 13, are flatly arranged on the major flat part of the base plate 8 in a manner to constitute a 1a layered structure. Accordingly, the power unit 7 of the present invention has a reduced thickness and thus a compact construction, which minimizes the reduction in the effective luggage receiving capacity of the trunk room 1a.

Second, the power unit 7 is equipped with an arrangement which can temporarily hold the output arm 13 at the over-stroke position "C" when the power unit 7 is not assembled on the vehicle body. Thus, conveyance of the power unit 7 and assembling work for the same are easily carried out.

Third, the essential parts 9, 10, 11, 22, 12 and 13 of the power unit 7 are mounted on both the side surfaces 8b and 8c of the base plate 8. Thus, balanced mounting of the parts is established, which brings about a reliable operation of the power unit 7.

Fourth, due to provision of the flange 8a of the base plate 8, the parts 22, 12, 14 and 15 arranged on and/or exposed to the left side surface 8c of the base plate 8 are protected or suppressed from interfering with surrounding external members. Furthermore, due to the same reason, the mechanical strength of the base plate 8 is increased, which assures a robust mounting of the power unit 7 onto the vehicle body.

The entire contents of Japanese Patent Application 2000-376453 filed Dec. 11, 2000 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A power unit for moving a lid between open and closed positions with the aid of electric power, comprising:

a base plate having mutually opposed first and second side surfaces;

first group of parts arranged on said first side surface, said first group of parts including an electric motor which outputs rotation, a speed reduction unit which reduces a speed of the rotation outputted from said motor and an electromagnetic clutch, said speed reduction unit having a gear member which is projected to said second side surface from said first side surface through an opening formed in said base plate and driven by said motor when said electromagnetic clutch assumes ON condition; and second group of parts arranged on said second side surface, said second group of parts including an intermediate gear which is rotatably connected to said base plate and meshed with said gear member, an output gear which is rotatably connected to said base plate through a shaft and meshed with said intermediate gear and an output arm which is connected to said output gear to rotate therewith, said output arm being linked to said lid.

2. A power unit as claimed in claim 1, in which said shaft is secured to said output gear to rotate therewith and in which said output arm has one end secured to said shaft thereby to rotate together with said output gear, said output arm having the other end which is linked to said lid.

3. A power unit as claimed in claim 1, in which said gear member, said intermediate gear, said output gear and said output arm are flatly arranged on said second side surface in a manner to constitute a layered structure.

4. A power unit as claimed in claim 3, in which said gear member having a gear shaft which is left at the first side surface, said gear shaft being incorporated with said electromagnetic clutch so that, upon ON condition of the electromagnetic clutch, the rotation force of said motor is transmitted to said gear shaft.

5. A power unit as claimed in claim 4, in which said electromagnetic clutch comprises:

a gear arranged at said first side surface and rotatably disposed on said gear shaft, said gear constantly connected with an output member of said motor;

an annular core tightly disposed on said gear shaft to rotate therewith;

an annular coil connected to said base plate and surrounding said annular core;

a bearing unit arranged between said annular core and said annular coil to smooth rotation of the annular core relative to said annular coil; and a disc plate member integral with said annular core, said disc plate member being put between said annular coil and said gear, so that upon energization of said coil, a magnetic force produced by said coil strongly pulls said gear toward said disc plate member thereby to couple said gear and said annular core.

6. A power unit as claimed in claim 1, in which said base plate is formed with a flange which is bent toward said second side surface thereby to surround said second group of parts.

7. A power unit as claimed in claim 1, further comprising first and second position sensors which sense predetermined angular ositions of said output arm, said first and second position ensors being set in respective openings formed in said base plate so that each position sensor is exposed to both the first and second side surfaces.

8. A power unit as claimed in claim 7, in which said first position sensor has a detector member exposed to said second side surface, and in which said output arm has a flange, said flange being brought into contact with said detector member when said output arm is turned to a first predetermined position.

9. A power unit as claimed in claim 8, in which said second position sensor has a detector member exposed to said second side surface, and in which said output arm has a projection, said projection being brought into contact with said detector member when said output arm is turned to a second predetermined position.

10. A power unit as claimed in claim 9, further comprising a temporarily holding arrangement which temporarily holds said output arm when said output arm is turned to a third predetermined position which is beyond said second predetermined position.

11. A power unit as claimed in claim 10, in which said temporarily holding arrangement comprises:

an engaging opening formed in said output arm; and an engaging projection formed on said base plate, wherein when said output arm is turned to said third predetermined position, said engaging opening catches said engaging projection thereby to achieve a soft latched engagement therebetween.

12. A power unit as claimed in claim 11, in which said output arm is arranged and sized to cover said detector member of said second position sensor when said output arm is in said third predetermined position.

13. A power unit as claimed in claim 3, in which said output gear is meshed with a smaller gear integral with said intermediate gear.

14. A power unit for pivoting an automotive trunk lid between open and closed positions with the aid of electric power, comprising:

a base plate having mutually opposed first and second side surfaces;

first group of parts arranged on said first side surface, said first group of parts including an electric motor which outputs rotation, a speed reduction unit which reduces a speed of the rotation outputted from said motor and an electromagnetic clutch, said speed reduction unit having a gear member which is projected to said second side surface from said first side surface through an opening formed in said base plate and driven by said motor when said electromagnetic clutch assumes ON condition;

second group of parts arranged on said second side surface, said second group of parts including an intermediate gear which is rotatably connected to said base plate and meshed with said gear member, an output gear which is rotatably connected to said base plate through a shaft secured to said output gear and meshed with said intermediate gear and an output arm which has one end secured to said shaft thereby to rotate together with said output gear, said output arm having the other end which is adapted to be linked to said trunk lid, said second group of parts being arranged flatly on said second side surface in a manner to constitute a layered structure; and a temporarily holding arrangement for temporarily holding said output arm at a predetermined given angular position, said temporarily holding arrangement including an engaging opening formed in said output arm; and an engaging projection formed on said base plate, wherein when said output arm is turned to said given angular position, said engaging opening catches said engaging projection thereby to achieve a soft latched engagement therebetween.

15. A power unit as claimed in claim 14, in which said first side surface of said base plate faces toward the interior of the trunk room and said second side surface of said base plate faces toward outside of the vehicle body.

* * * * *